US007309100B2

(12) United States Patent
Sawajiri

(10) Patent No.: US 7,309,100 B2
(45) Date of Patent: Dec. 18, 2007

(54) LATCH DEVICE FOR VEHICLE REAR PANEL DOOR

(75) Inventor: Yukio Sawajiri, Yamanashi-ken (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 94 days.

(21) Appl. No.: 11/066,563

(22) Filed: Feb. 28, 2005

(65) Prior Publication Data

US 2006/0061133 A1 Mar. 23, 2006

(30) Foreign Application Priority Data

Feb. 27, 2004 (JP) ............................ 2004-052816

(51) Int. Cl.
*B60J 5/00* (2006.01)

(52) U.S. Cl. .............................. 296/146.1; 296/146.9; 292/336.3; 292/DIG. 3; 292/DIG. 23

(58) Field of Classification Search ............ 296/146.9, 296/146.1; 49/394, 502, 503; 292/DIG. 3, 292/DIG. 23, DIG. 65, DIG. 21, DIG. 27, 292/223, 336.3
See application file for complete search history.

(56) References Cited

U.S. PATENT DOCUMENTS 5,749,611 A * 5/1998 Watson et al. ........... 292/336.3
5,803,516 A * 9/1998 Hempel ................... 292/336.3
6,017,067 A * 1/2000 Yoneyama et al. ......... 292/216
6,752,440 B2 * 6/2004 Spurr ....................... 292/336.3
6,848,737 B2 * 2/2005 Mikolai et al. .......... 296/146.9
6,913,309 B2 * 7/2005 Mikolai et al. .......... 296/146.1
6,964,440 B2 * 11/2005 Lebsack et al. .......... 292/336.3
2004/0104595 A1 * 6/2004 Carey et al. ............. 296/146.9
2006/0043762 A1 * 3/2006 Sawajiri .................. 296/146.1
2006/0061133 A1 * 3/2006 Sawajiri .................. 296/146.1

* cited by examiner

*Primary Examiner*—Jason S Morrow
(74) *Attorney, Agent, or Firm*—Browdy and Neimark, PLLC

(57) ABSTRACT

A latch device for an access panel door comprises an open lever and a ratchet release lever which are pivotally mounted on a base plate by a first shaft, a coupling spring to resiliently link the open lever to the release lever, a door detection lever being rotated in response to abutment against a rear panel of a front door, and a lock lever pivotally mounted on the plate by a second shaft and displaceable in response to the rotation of the detection lever. The lock lever is configured so as to mechanically abut against the ratchet release lever when displaced to a locked position and be able to restrict the rotation of the release lever. The coupling spring has a first leg to urge the open lever to a first direction and a second leg to bias both of the open lever and the release lever to a second direction.

4 Claims, 8 Drawing Sheets

FIG. 11
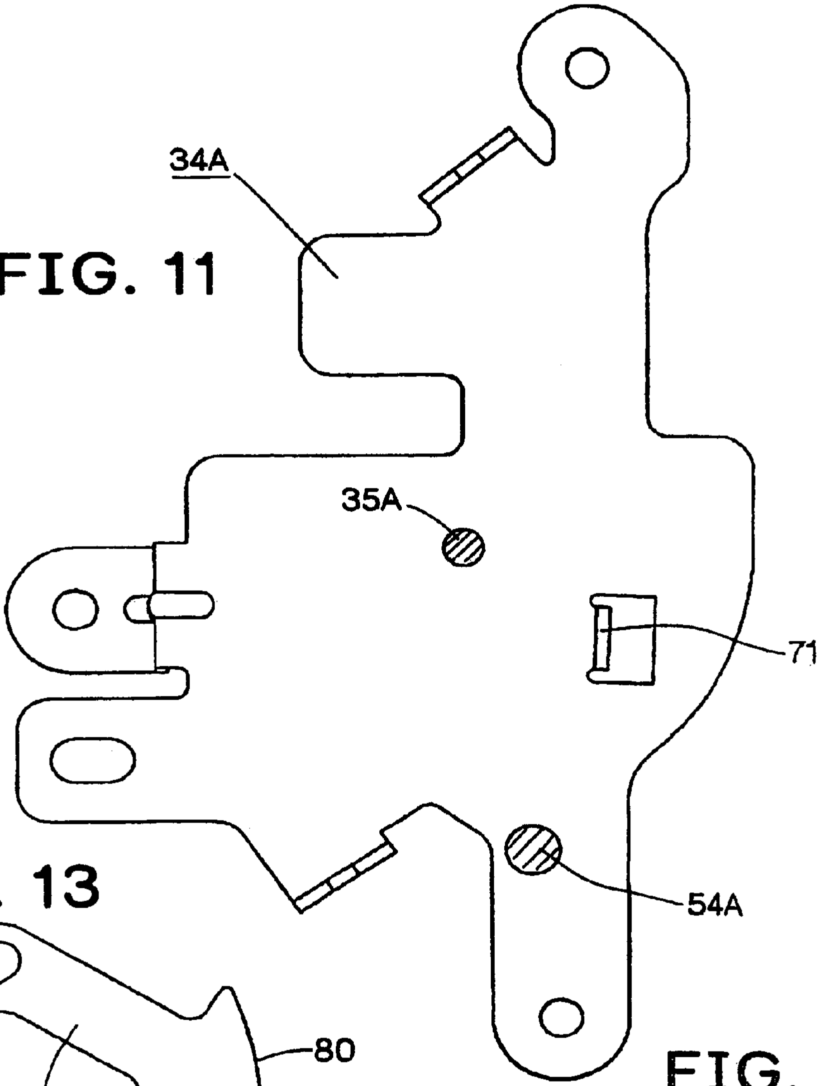
FIG. 13
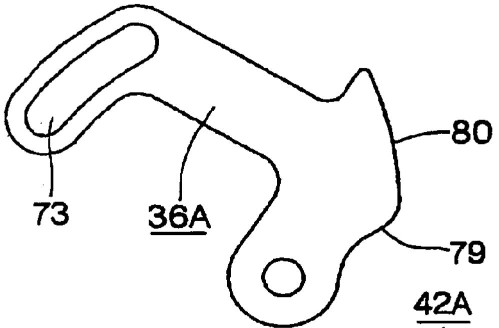
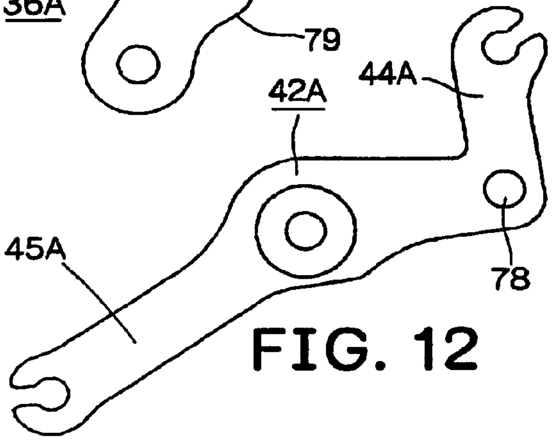
FIG. 12
FIG. 14
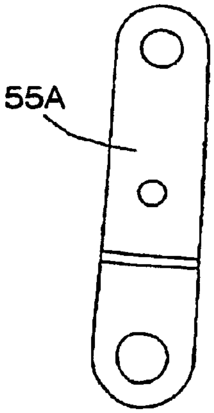

LATCH DEVICE FOR VEHICLE REAR PANEL DOOR

FIELD OF THE INVENTION

The present invention relates to a door latch device, and more particularly to a latch device that is utilized for a vehicle access panel door (rear door of the double side door construction).

DESCRIPTION OF THE RELATED ART

Conventionally, an access panel door has been used most of the time as a door for the rear seat of pickup trucks, which structure is described fully in U.S. Pat. No. 4,930,836.

The access panel door is desirable to have a structure in which opening of the access door is possible only when a front door is open. For this purpose, a door latch device used for such access panel doors is configured such that the door latch device automatically turns to a locked position when the front door is closed (U.S. Pat. No. 5,803,516).

The known door latch device suffers from the disadvantage that a number of components are required.

OBJECT OF THE INVENTION

Accordingly, the object of the present invention is to provide a latch device for an access panel door having a reduced number of components.

BRIEF DESCRIPTION OF THE DRAWINGS

FIG. 11 is a front view of a base plate of the linkage unit in the second embodiment;

FIG. 12 is a front view of a ratchet release lever of the linkage unit in the second embodiment;

FIG. 13 is a front view of an open lever of the linkage unit in the second embodiment;

FIG. 14 is a front view of a lock lever of the linkage unit in the second embodiment;

DESCRIPTION OF THE PREFERRED EMBODIMENTS

Figure 1:
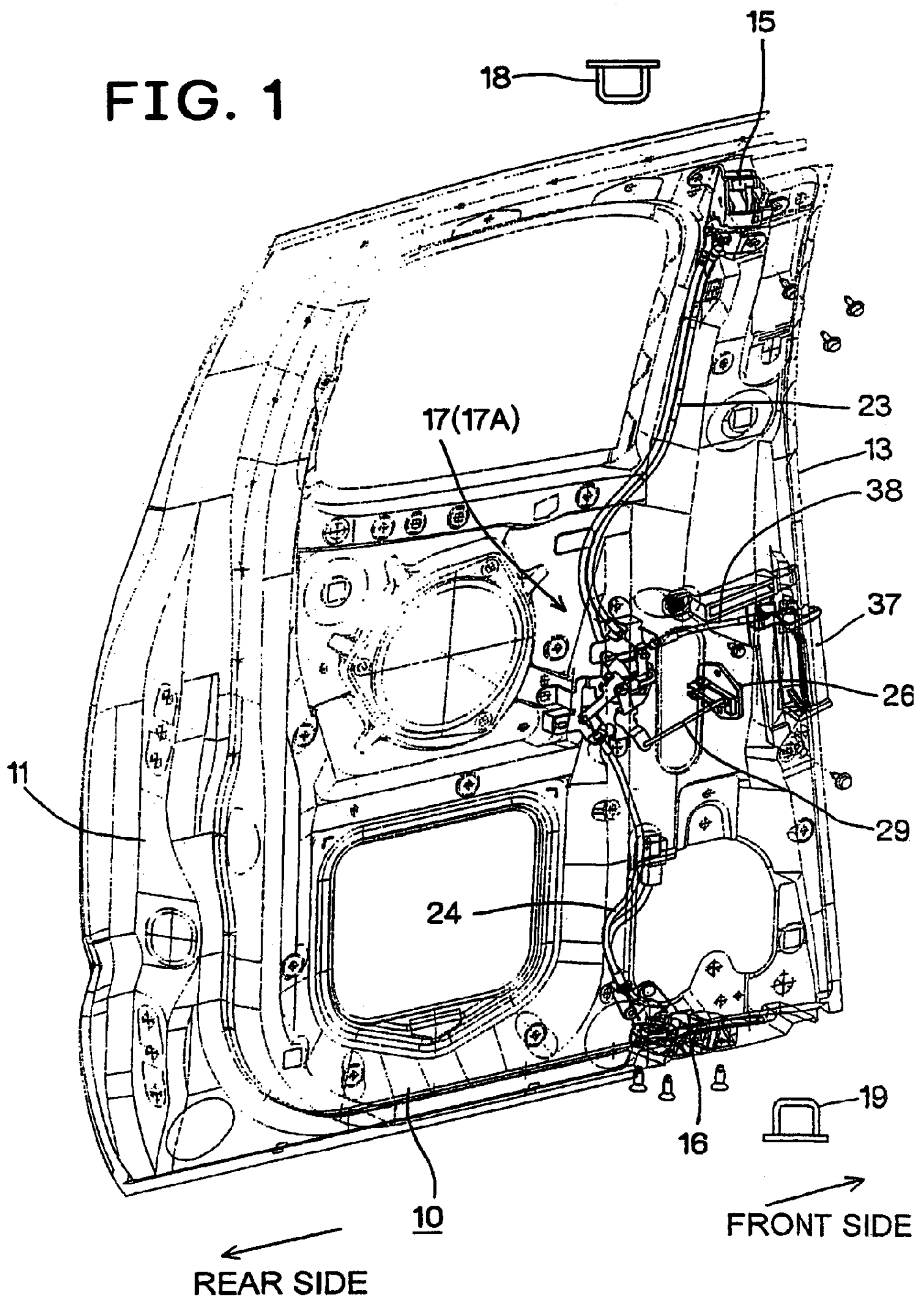
FIG. 1 is a perspective view showing the interior side of a rear door (access panel door) provided with a door latch device according to the present invention.

A first embodiment of the present invention will now be explained. FIG. 1 shows the interior side of a rear door (access panel door) 10 provided with a door latch device according to the present invention, in which a rear edge 11 of the rear door 10 is pivotally mounted on a vehicle body by a hinge and the like. A front door 12 (FIG. 2) is mounted by a hinge for pivotal movement about its front edge as is well known.

Figure 2:
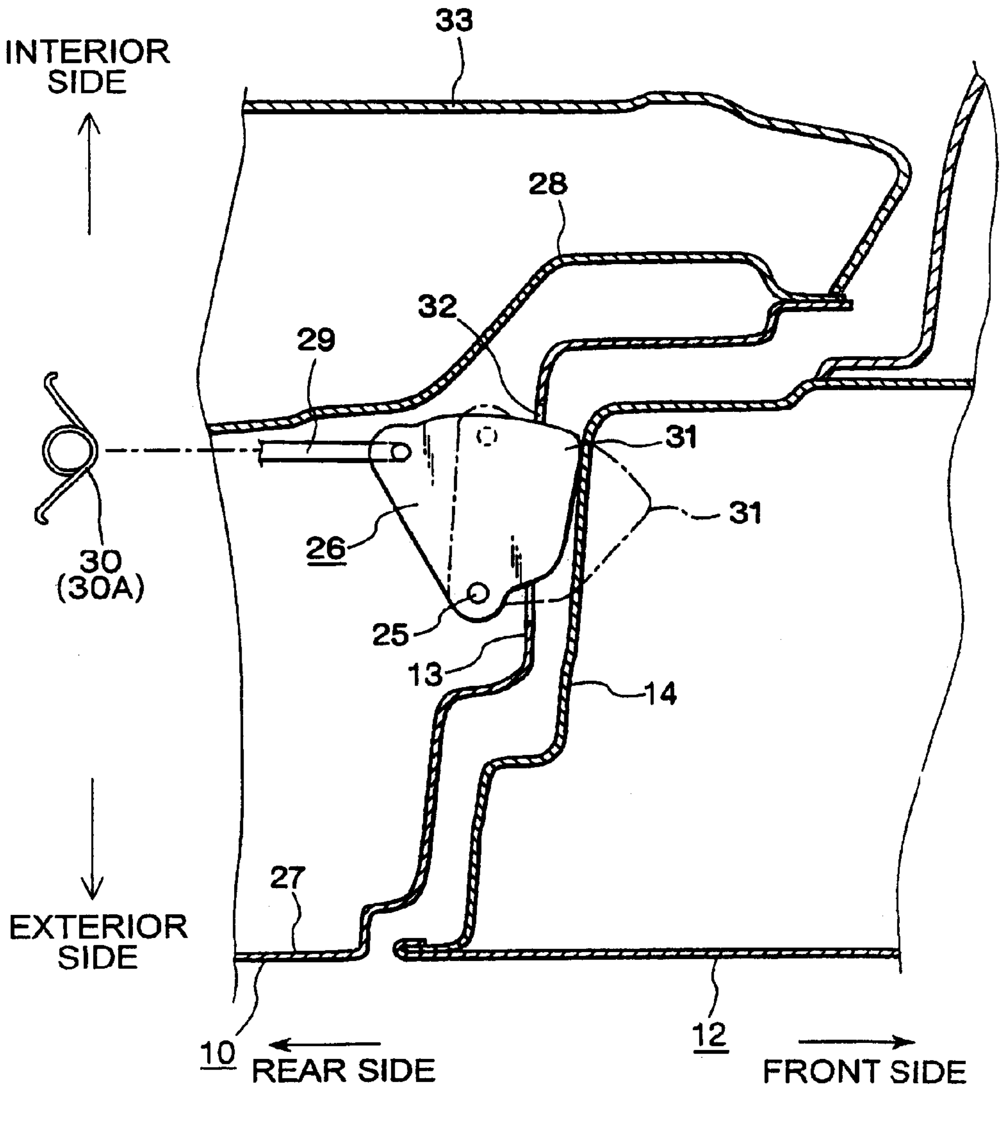
FIG. 2 is a sectional view showing a relationship between a front portion of the rear door and a rear portion of the front door when the rear door and the front door are both closed.

FIG. 2 shows a relationship between a front portion of the rear door 10 and a rear portion of the front door 12 when the rear door 10 and the front door 12 are both closed. Under the closed door condition as described herein above, a front panel 13 of the rear door 10 and a rear panel 14 of the front door 12 are adjacently opposed to each other in a substantially parallel state, and no door pillar and the like may be disposed between the rear door 10 and the front door 12.

The door latch device comprises an upper latch unit 15 disposed at an upper part of the door 10, a lower latch unit 16 disposed at a lower part of the door 10, and a linkage unit 17 operatively connected to the latch units 15 and 16. When the rear door 10 is closed, the latch units 15, 16 engage strikers 18, 19 fixed onto the vehicle body so as to hold the door 10 in the closed position.

Figure 3:
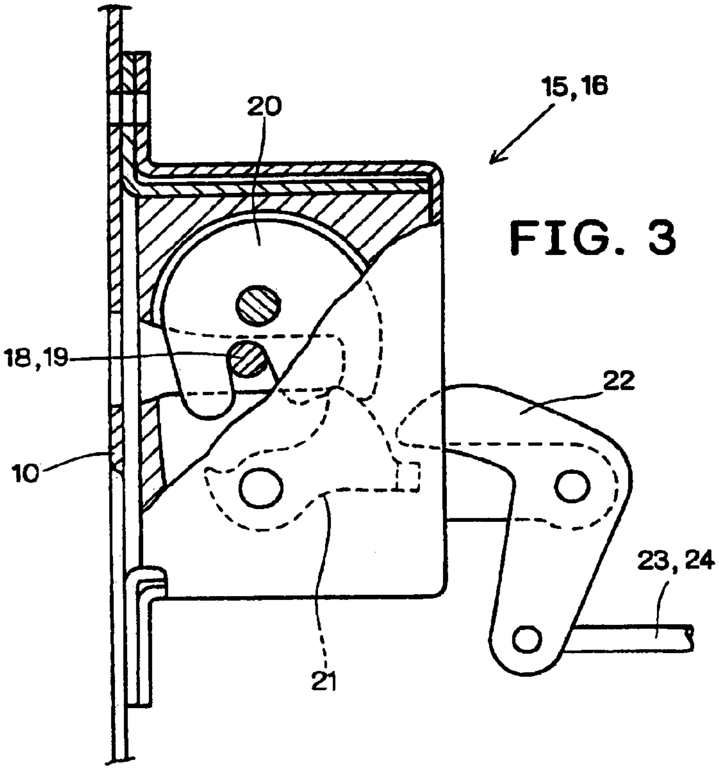
FIG. 3 is a partially longitudinal sectional view of a latch unit of the door latch device.
Figure 5:
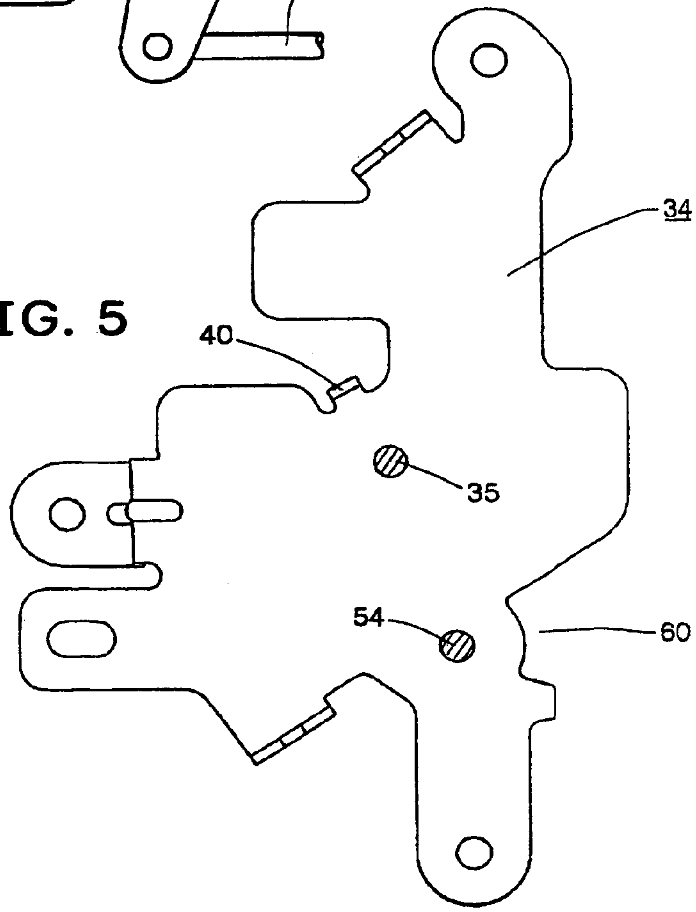
FIG. 5 is a front view of a base plate of the linkage unit.

As shown in FIG. 3, each of the latch units 15, 16 has same configuration and, as is well known, comprises a latch 20 which is engageable with the striker 18 or 19, a ratchet 21 which is engageable with the latch 20, and a ratchet levers 22. The ratchet lever 22 of each of units 15, 16 is connected to the linkage unit 17 by connecting means 23 or 24 such as a rod or cable and the like. When the ratchet lever 22 is rotated counterclockwise in FIG. 3, the ratchet 21 is disengaged from the latch 20 to enable the rear door 10 to be opened.

As shown in FIG. 2, the door latch device has a door detection lever 26 pivotally mounted on the rear door 10 by a shaft 25. The door detection lever 26 is disposed between an outer metal panel 27 and an inner metal panel 28 and adjacent to the front panel 13. The door detection lever 26 is coupled to the linkage unit 17 by a connecting means 29 and is urged in a clockwise direction in FIG. 2 by resilience of a spring 30. A front end 31 of the door detection lever 26 projects forwardly outwardly from the rear door 10 through a window 32 of the front panel 13. When the front door 12 has been closed, the door detection lever 26 pivots from the position indicated by an imaginary line to the position indicated by a solid line against the resilience of the spring 30 due to an abutment against the rear panel 14 of the front door 12, thereby closure of the front door 12 is detected. A reference numeral 33 shows a trim panel of the rear door 10.

Figure 4:
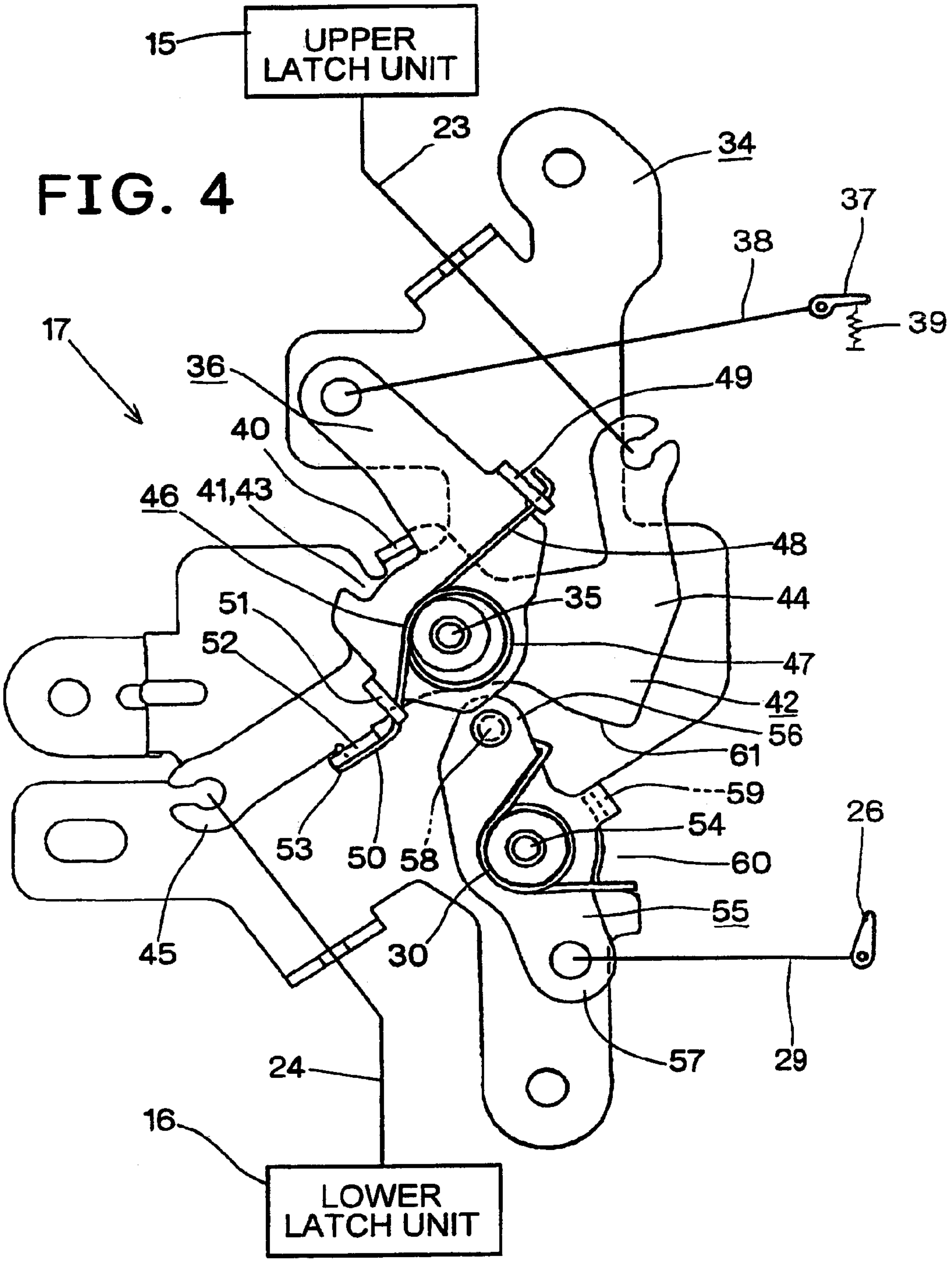
FIG. 4 is a front view of a linkage unit according to a first embodiment of the present invention.
Figure 6:
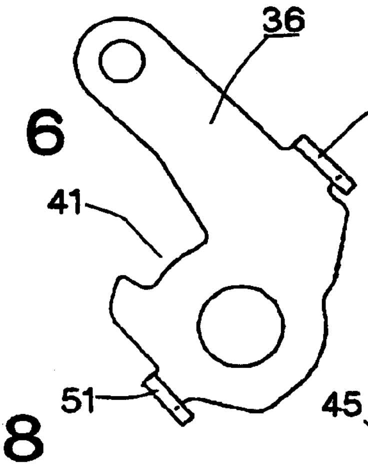
FIG. 6 is a front view of an open lever of the linkage unit.
Figure 9:
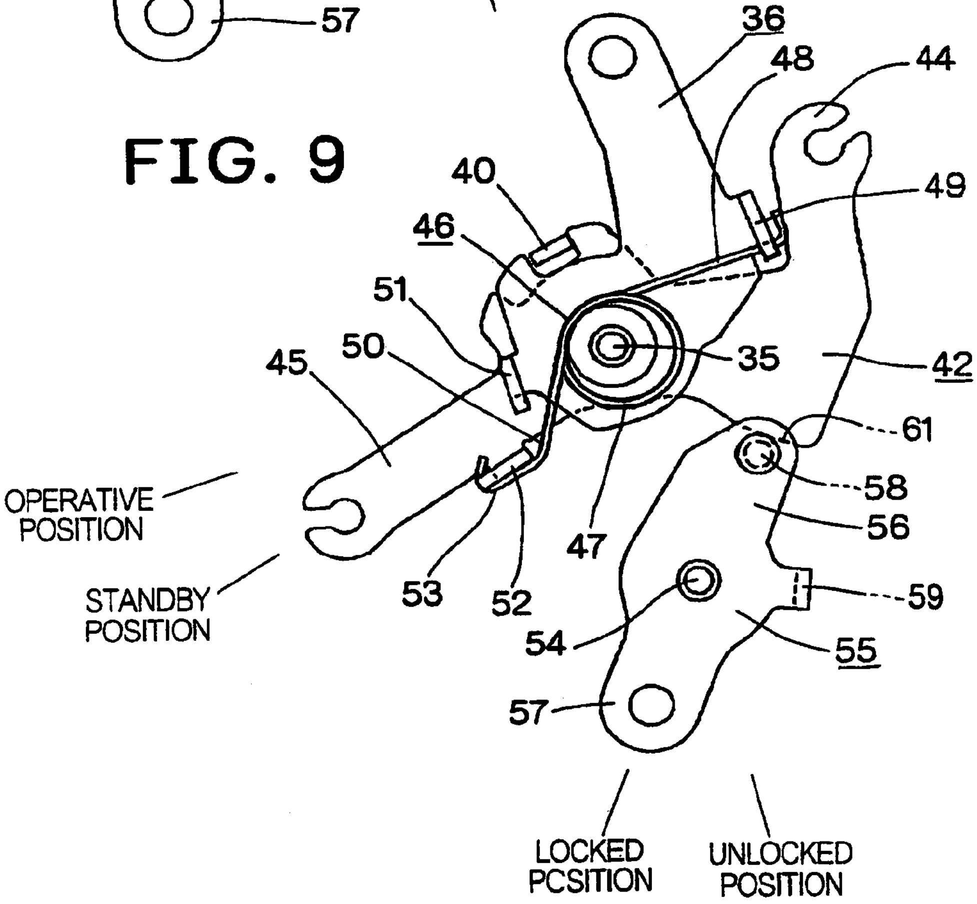
FIG. 9 is a front view showing a locked condition of the linkage unit.

As shown in FIG. 4, the linkage unit 17 comprises a base plate 34 fixed onto the rear door 10, and an open lever 36 (FIG. 6) is pivotally mounted on the base plate 34 by a shaft 35. The open lever 36 is connected to an open handle 37 on the rear door 10 by a connecting means 38 such as a rod or cable and the like. When the open handle 37 is operated toward a door-opening direction against resilience of a spring 39, the open lever 36 is rotated clockwise from a standby position (FIG. 4) to an operative position (FIG. 9). The rotational range of the open lever 36 is defined by an engagement between a bent portion 40 of the base plate 34 and an elongated recess 41 of the open lever 36.

Figure 7:
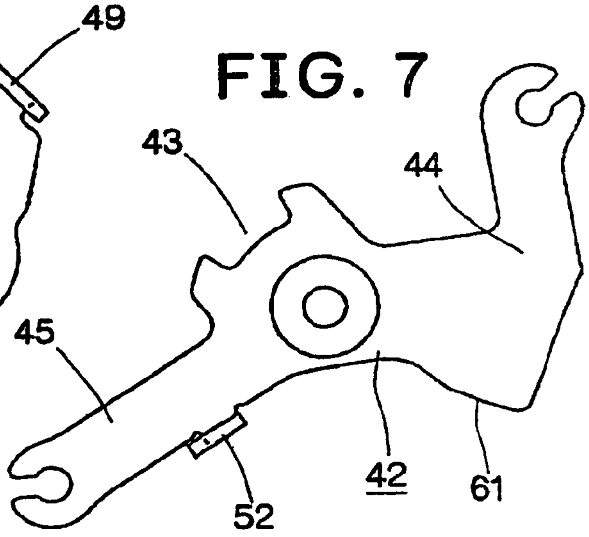
FIG. 7 is a front view of a ratchet release lever of the linkage unit.

A ratchet release lever 42 (FIG. 7) is pivotally mounted on the base plate 34 by the shaft 35 and underlies the open lever 36. The rotational range of the ratchet release lever 42 is defined by an engagement of the bent portion 40 of the base plate 34 with an elongated recess 43 of the ratchet release lever 42. The ratchet release lever 42 is integrally provided with first and second arms 44 and 45 which extend in a radial direction of the shaft 35. The first arm 44 is connected to the upper latch unit 15 by the connecting means 23 and the second arm 45 is connected to the lower latch unit 16 by the connecting means 24, and when the ratchet release lever 42 is rotated from a standby position as shown in FIG. 4 to an operative position, the latch units 15, 16 release the strikers 18, 19 to enable the rear door 10 to be opened.

A coiled portion 47 of a coupling spring 46 having a considerably strong resilient force is disposed around the periphery of the shaft 35. A first leg 48 of the coupling spring 46 engages a primary bent portion 49 to urge the open lever 36 in a counterclockwise direction, and a second leg 50 of the coupling spring 46 abuts against a secondary bent portion 51 of the open lever 36 to bias the open lever 36 in the clockwise direction. The open lever 36 in the standby position as seen in FIG. 4 receives resilient forces acted by both of the legs 48, 50 in such a manner as to cancel out each other. As a result, the open lever 36 is brought into a condition free in effect from a driving force in either direction. The second leg 50 has, at a distal end thereof, is provided with a hook 53 which is engaged with a bent portion 52 of the ratchet release lever 42. The second leg 50 is arranges so as to simply abut against the secondary bent portion 51 of the open lever 36. Whereas, with respect to the ratchet release lever 42 the second leg 50 is undetachably engaged by means of the hook 53.

Under the condition as shown in FIG. 4, when the open lever 36 is rotated clockwise from the standby position (FIG. 4) to the operative position in response to an opening operation of the open handle 37 toward the door-opening direction, as both of the legs 48, 50 tend to maintain the state abutting against the bent portions 49, 51 of the open lever 36, the second leg 50 of the coupling spring 46 urges the ratchet release lever 42 in the clockwise direction in association with the turning of the open lever 36 in order to rotate the ratchet release lever 42 clockwise. As a result, the latch units 15, 16 release strikers 18, 19 to enable the rear door 10 to be opened. As described herein above, the open lever 36 and the ratchet release lever 42 are resiliently linked by the coupling spring 46.

Figure 8:
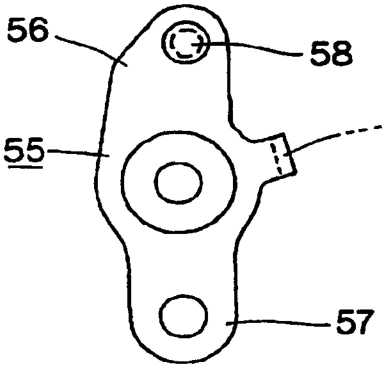
FIG. 8 is a front view of a lock lever of the linkage unit.

A blocking type lock lever 55 (FIG. 8) is pivotally mounted on the base plate 34 by a shaft 54. The lock lever 55 has an upper arm 56 and a lower arm 57, and a block pin 58 is disposed on the upper arm 56 while the lower arm 57 is connected to the door detection lever 26 by the connecting means 29. The spring 30 urges the lock lever 55 in the counterclockwise direction in FIG. 4 and drives the door detection lever 26 in the clockwise direction in FIG. 2.

The rotational range of the lock lever 55 is defined by an engagement of a bent portion 59 of the lock lever 55 with an elongated recess 60 of the base plate 34. When the door detection lever 26 is rotated counterclockwise against the resilience of the spring 30 in response to abutment against the rear panel 14 of the front door 12, the lock lever 55 is displaced to the locked position as shown in FIG. 9, thereby the block pin 58 is engageably opposed to an abutting edge 61 formed on a lower surface of the first arm 44 of the ratchet release lever 42. On the other hand, when the door detection lever 26 is freed from the abutment against the rear panel 14 and projected outwardly in response to the opening of the front door 12, the lock lever 55 is displaced to the unlocked position as shown in FIG. 4, thereby the block pin 58 spaces apart from the abutting edge 61 of the ratchet release lever 42.

When the open lever 36 is rotated clockwise from the standby position (FIG. 4) to the operative position in response to the opening operation of the open handle 37 while the lock lever 55 is in the locked position, the second leg 50 of the coupling spring 46 drives the ratchet release lever 42 in the clockwise direction. In this case, however, as the abutting edge 61 of the ratchet release lever 42 butts against the block pin 58 as shown in FIG. 9, the ratchet release lever 42 is prevented from clockwise rotation, thereby only the open lever 36 rotates clockwise leaving the ratchet release lever 42 behind while the coupling spring 46 resiliently enlarges its width. As described herein above, when the lock lever 55 is in the locked position as the rotation of the ratchet release lever 42 from the standby position to the operative position in the clockwise direction is restricted, the rear door 10 cannot be opened despite of the opening operation of the open handle 37 toward the door-opening direction.

Now, the operation of the first embodiment will be explained.

When the front door 12 is open, the door detection lever 26 is pivoted forwardly outwardly a substantial distance by a resilient force of the spring 30 as indicated by the imaginary line in FIG. 2, the lock lever 55 connected to the door detection lever 26 by the connecting means 29 is held at the unlocked position as shown in FIG. 2, and the block pin 58 of the lock lever 55 spaces apart from the abutting edge 61 of the ratchet release lever 42.

Under the unlocked condition (the front door 12 being open), when the open lever 36 is rotated clockwise from the standby position (FIG. 4) to the operative position in response to the opening operation of the open handle 37, as both of the legs 48, 50 tend to maintain the state abutting against the bent portions 49, 51 of the open lever 36, the second leg 50 of the coupling spring 46 urges the ratchet release lever 42 in the clockwise direction in association with the turning of the open lever 36 in order to rotate the ratchet release lever 42 clockwise. As a result, the latch units 15, 16 release strikers 18, 19 to enable the rear door 10 to be opened.

Furthermore, under the unlocked condition the coupling spring 46 provides no resistance in effect in the opening operation of the open handle 37 toward the door-opening direction, but simply acts as a linkage member coupling the open lever 36 to the ratchet release lever 42.

On the other hand, when the front door 12 has been closed, the door detection lever 26 is pushed from the imaginary line position to the solid line position in response to the abutment against the rear panel 14 of the front door 12, the lock lever 55 connected to the door detection lever 26 by the connecting means 29 turns to the locked position through clockwise rotation, thereby the block pin 58 takes a position to oppose in an abuttable relation to the abutting edge 61 of the ratchet release lever 42.

Under the locked condition (the front door 12 being closed), when the open lever 36 is rotated clockwise from the standby position to the operative position in response to the opening operation of the open handle 37, the second leg 50 of the coupling spring 46 drives the ratchet release lever 42 in the clockwise direction. In this case, however, as the abutting edge 61 of the ratchet release lever 42 butts against the block pin 58 as shown in FIG. 9, the ratchet release lever 42 is prevented from clockwise rotation, thereby only the open lever 36 rotates leaving the ratchet release lever 42 behind while the coupling spring 46 resiliently enlarges its width. As described herein above, when the lock lever 55 is in the locked position as the rotation of the ratchet release lever 42 from the standby position to the operative position in the clockwise direction is restricted, the rear door 10 is unable to be opened despite of the opening operation of the open handle 37 toward the door-opening direction.

Furthermore, under the locked condition the coupling spring 46 responds with a physical resistance to the opening operation of the open handle 37 toward the door-opening direction, however, this resistance may be utilized as an indication for the operator that the rear door 10 is unable to be opened.

FIGS. 10 through 16 show a linkage unit 17A according to a second embodiment of the present invention. A lost-motion mechanism is employed in the second embodiment.

Figure 10:
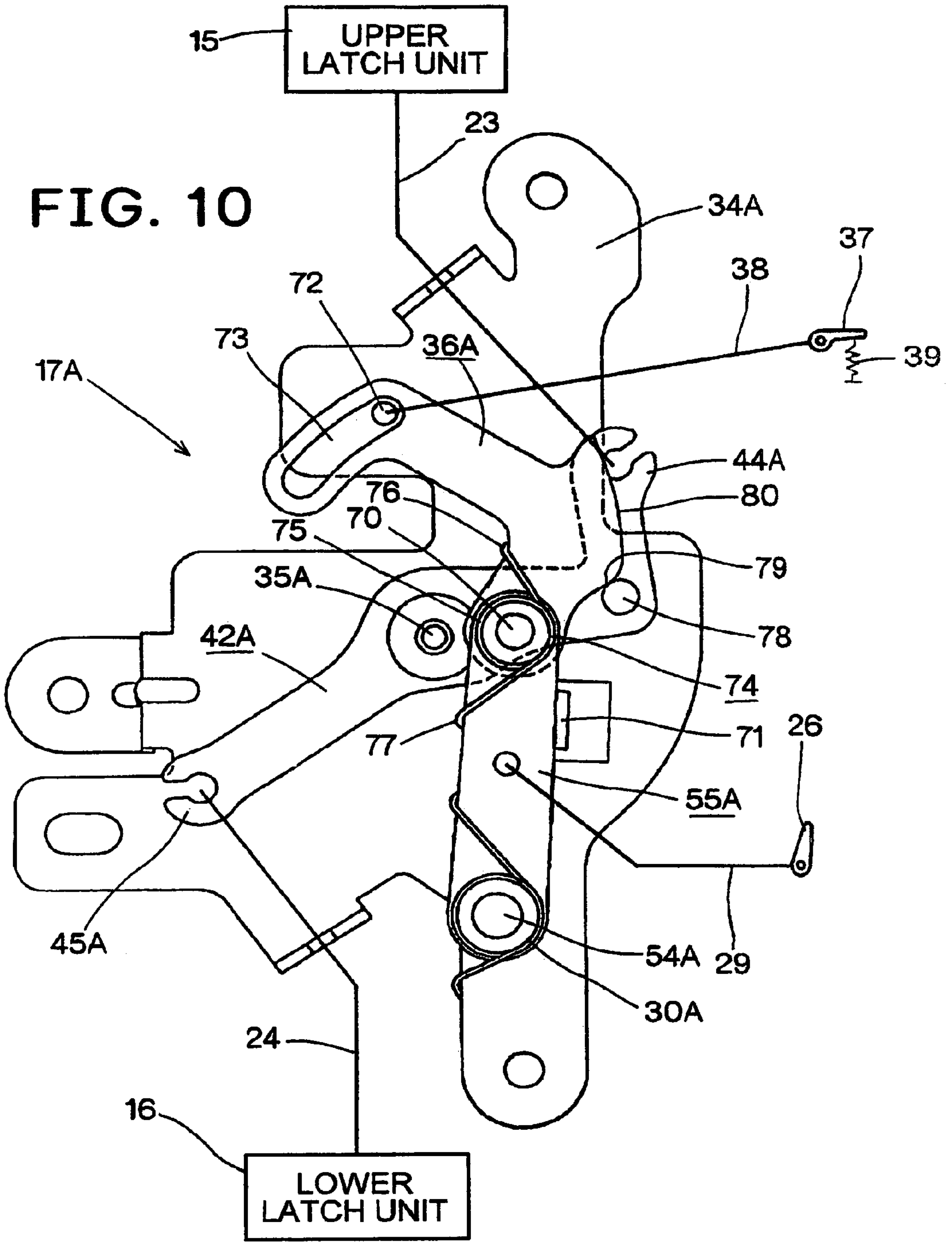
FIG. 10 is a front view of a linkage unit according to a second embodiment of the present invention.

As shown in FIG. 10, a linkage unit 17A in the second embodiment has a base plate 34A fixed onto the rear door 10, and a ratchet release lever 42A (FIG. 12) is pivotally mounted on the base plate 34A by a shaft 35A. The ratchet release lever 42A is integrally provided with a first arm 44A and a second arm 45A which extend in the radial direction of the shaft 35A. The first arm 44A is connected to the upper latch unit 15 by the connecting means 23 and the second arm 45 is connected to the lower latch unit 16, whereas when the ratchet release lever 42A is rotated clockwise from a standby position to an operative position the latch units 15, 16 release the strikers 18, 19 to enable the rear door 10 to be opened.

An open lever 36A (FIG. 13) in the second embodiment is rotatably mounted on a shaft 70, independent of the shaft 35A, and is connected to the open handle 37 of the rear door 10 by the connecting means 38 such as a rod or cable and the like. When the open handle 37 is operated toward the door-opening direction against resilience of the spring 39, the open lever 36A rotates clockwise about the shaft 70.

Figure 15:
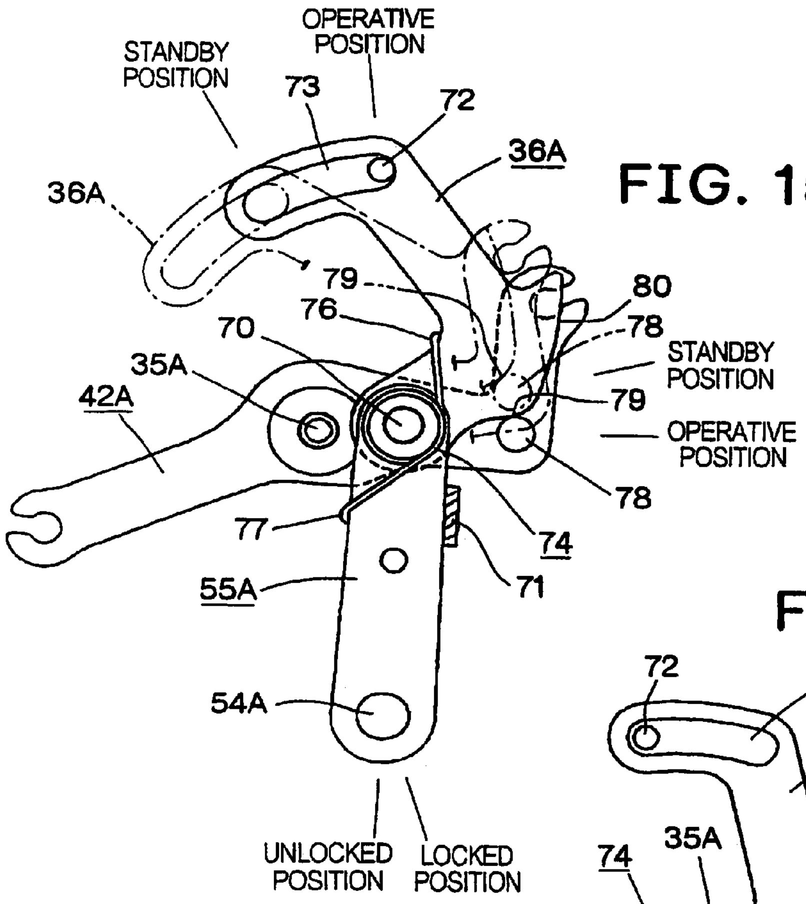
FIG. 15 is a front view of the linkage unit in the second embodiment in which the open lever is rotated to an operative position while the linkage unit being in an unlocked condition.
Figure 16:
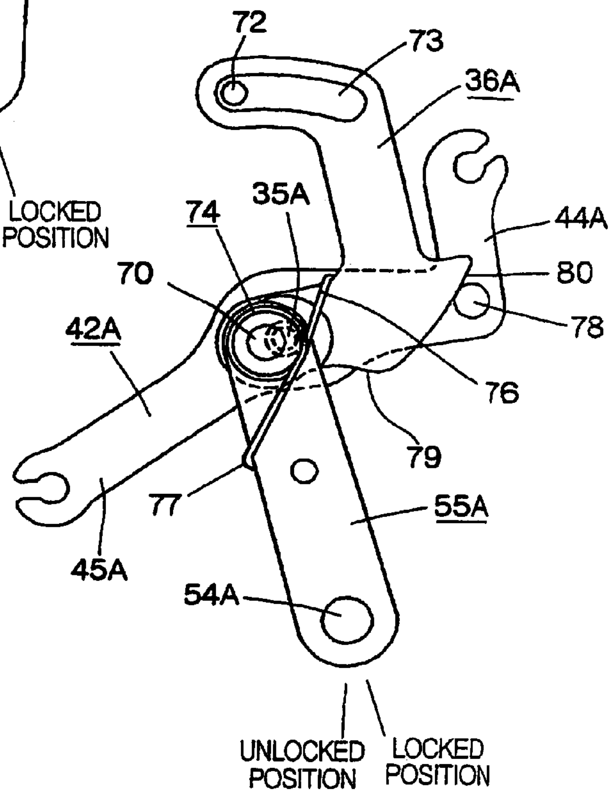
FIG. 16 is a front view showing a locked condition of the linkage unit in the second embodiment.

A lock lever 55A (FIG. 14) is pivotally mounted on the base plate 34A by a shaft 54A. The lock lever 55A is connected to the door detection lever 26 by the connecting means 29. The lock lever 55A is urged by a resilient force of a spring 30A in the clockwise direction in FIG. 10 and the resilient force of the spring 30A is transmitted to the door detection lever 26 by the connecting means 29. When the door detection lever 26 is freed from the abutment against the rear panel 14 and outwardly protruded in the event that the front door 12 has been opened, the lock lever 55A abuts against a bent portion 71 of the base plate 34A and is held in the unlocked position (FIGS. 10, 15). When the door detection lever 26 is rotated counterclockwise against the resilience of the spring 30A in response to the abutment against the rear panel 14 of the front door 12, the lock lever 55A is displaced to a locked position as shown in FIG. 16.

An end 72 of the connecting means 38 engages an arcuate slot 73 formed on the open lever 36A. The arcuate slot has its center at the shaft 70. The lost-motion mechanism employed in the second embodiment is configured by the arcuate slot 73 and the end 72.

On an upper part of the lock lever 55A the open lever 36A is pivotally mounted by the shaft 70, and around the periphery of the shaft 70 a coiled portion 75 of the spring 74 is located. A first leg 76 of the spring 74 engages the open lever 36A and a second leg 77 abuts against the lock lever 55A to urge the open lever 36A in the clockwise direction.

On the periphery of the open lever 36A formed are a pressure-applying face 79 that can abut against an abutting pin 78 of the ratchet release lever 42A and a slant escape face 80. The pressure-applying face 79 extends radially from the center of the shaft 70, and under the unlocked condition as shown in FIG. 10 the pressure applying face 79 of the open lever 36A biased by the spring 74 in the clockwise direction abuts against the abutting pin 78. Here, the resilient force of the spring 74 is so weak that the resilient force of the spring 74 alone may not rotate the ratchet release lever 42A. Under the unlocked condition as shown in FIG. 10 when the end 72 of the connecting means 38 is moved rightward in response to the opening operation of the open handle 37, the end 72 immediately impinges against the arcuate slot 73 of the open lever 36A and rotates the open lever 36A clockwise. As a result, as shown in FIG. 15, the pressure-applying face 79 of the open lever 36A pushes the ratchet release lever 42A for rotation clockwise, thereby the latch units 15, 16 release the strikers 18, 19 to enable the rear door 10 to be opened. As described herein above, as the lost-motion between the arcuate slot 73 and the end 72 is in an inactive state under the unlocked condition, the rear door 10 can be opened.

The slant escape face 80 is formed continuously from the pressure-applying face 79 and has an increasing distance from the shaft 70 as it spaces apart from the pressure-applying face 79. When the lock lever 55A is displaced from the unlocked position to the locked position, the shaft 70 gradually moves away from the abutting pin 78, and the pressure-applying face 79 of the open lever 36A disengages the abutting pin 78 to bring the slant escape face 80 instead of the pressure-applying face 79 into abutment against the abutting pin 78 as shown in FIG. 16. Furthermore, because of a fact that the shaft 70 moves away from the abutting pin 78 and also the slant escape face 80 is brought into abutment against the abutting pin 78 instead of the pressure-applying face 79 disengaged the abutting pin 78, the open lever 36A is rotated clockwise about the shaft 70 with respect to the lock lever 55A by resilience of the spring 74 and the end 72 of the connecting means 38 moves from one end of the arcuate slot 73 to the other end as shown in FIG. 16.

In the locked condition as shown in FIG. 16, as the lost-motion is active in which the end 72 of the connecting means 38 has been moved from one end of the arcuate slot 73 to the other end, despite of a rightward movement of the end 72 of the connecting means 38 in response to the opening operation of the open handle 37, and the end 72 simply slides toward one end within the arcuate slot 73, thereby no clockwise rotation of the open lever 36A can be effected. As a result, the rear door 10 is restricted from opening.

Now, the operation of the second embodiment will be explained.

When the front door 12 is open, the door detection lever 26 is pivoted forwardly outwardly a substantial distance by the resilient force of the spring 30 as indicated by the imaginary line in FIG. 2, the lock lever 55A connected to the door detection lever 26 by the connecting means 29 is held at the unlocked position as shown in FIG. 10, and the open lever 36A is urged to rotate in the clockwise direction by the spring 74 to retain the pressure-applying face 79 in abutment against the abutting pin 78. In this unlocked condition, when the end 72 of the connecting means 38 is moved rightward in response to the opening operation of the open handle 37 toward the door-opening direction, the end 72 immediately abuts against the arcuate slot 73 of the open lever 36A for clockwise rotation of the open lever 36A. Then, as shown in FIG. 15, the pressure-applying face 79 of the open lever 36A pushes the abutting pin 78 for clockwise rotation of the ratchet release lever 42A, thereby the latch units 15, 16 release the strikers 18, 19 to enable the rear door 10 to be opened. As described herein above, under the unlocked condition, as the lost-motion between the arcuate slot 73 and the end 72 is inactive, the rear door 10 can be opened.

Whereas, in the event that the front door 12 has been closed, the door detection lever 26 is pushed from the imaginary line position into the solid line position due to the engagement with the rear panel 14 of the front door 12, thereby the lock lever 55A connected to the door detection lever 26 by the connecting means 29 rotates counterclockwise for movement from the unlocked position to the locked position. Then, the shaft 70 moves away from the abutting pin 78, and the pressure-applying face 79 of the open lever 36A disengages the abutting pin 78 and the slant escape face 80 instead of the pressure-applying face 79 is brought into abutment against the abutting pin 78 as shown in FIG. 16. Furthermore, because of a fact that the shaft 70 moves away from the abutting pin 78 and also the pressure-applying face 79 of the open lever 36A disengages the abutting pin 78 and then the slant escape face 80 is brought into abutment against the abutting pin 78 instead of the pressure-applying face 79, the open lever 36A is rotated clockwise about the shaft 70 with respect to the lock lever 55A by the resilience of the spring 74, thereby the end 72 of the connecting means 38 moves from one end of the arcuate slot 73 to the other end as shown in FIG. 16.

In the locked condition as shown in FIG. 16, as the lost-motion is active in which the end 72 of the connecting means 38 has been moved from one end of the arcuate slot 73 to the other end, despite of a rightward movement of the end 72 of the connecting means 38 in response to the opening operation of the open handle 37 toward the door-opening direction, the end 72 of the connecting means 38 simply slides from one end toward the other end within the arcuate slot 73 and spaces apart from the open lever 36A, thereby no rotation of the open lever 36A clockwise can be effected. As a result, the rear door 10 cannot be opened.

ADVANTAGES

According to the present invention, as the open lever 36 and the ratchet release lever 42 are configured for resilient linkage by means of the coupling spring 46, the linkage unit 17 requires only three levers, i.e., the open lever 36, ratchet release lever 42, and the lock lever 55, thereby further rationalization can be materialized in comparison with conventional door latch devices for access panel doors. Furthermore, as both of the legs 48, 50 of the coupling spring 46 provide in effect no resilience in either direction, operation of the open handle 37 toward the door-opening direction may be met with virtually no resistance, and feeling associated with the opening operation of the open handle 37 may not be deteriorated.

Furthermore, the ratchet release lever 42 is held by the coupling spring 46 without generation of any rattling motion for attaining a rational configuration.

Also, as the open lever 36A is pivotally mounted on the lock lever 55A by the shaft 70 and the open lever 36A and the third connecting means 38 are linked by the lost-motion mechanism that is activated when the lock lever 55A has been displaced to the locked position, the linkage unit 17A requires only three levers, i.e., the open lever 36A, the ratchet release lever 42A, and the lock lever 55A, thereby further rationalization can be materialized in comparison with conventional door latch devices for access panel doors.

Furthermore, the present invention renders a simple configuration in which the lost-motion mechanism is activated when the lock lever 55A has been displaced from the unlocked position to the locked position.

The invention claimed is:

1. A door latch device for a vehicle rear door having a front panel adjacently opposed to a rear panel of a vehicle front door in a substantially parallel condition when the front door is moved to a door closed position with respect to a vehicle body, wherein the front door is pivotally mounted on the vehicle body at its front edge part, the rear door is pivotally mounted on the vehicle body at its rear edge part, and the door latch device prevents the rear door from opening when the front door is closed and enables the rear door to be opened when the front door is opened, the door latch device comprising:

an upper latch unit provided at an upper part of the rear door for engagement with an upper striker fixed onto the vehicle body;

a lower latch unit provided at a lower part of the rear door for engagement with a lower striker fixed onto the vehicle body;

a base plate secured on the rear door;

a ratchet release lever pivotally mounted on the base plate by a first shaft, said ratchet release lever comprising a first arm connected to the upper latch unit by a first connecting means, and a second arm connected to the lower latch unit by a second connecting means;

an open lever pivotally mounted on the base plate by the first shaft and connected to an open handle of the rear door;

a coupling spring to resiliently link the open lever to the ratchet release lever;

a door detection lever pivotally mounted on the rear door by a second shaft and rotatable in response to abutment against the rear panel of the front door when the front door is closed; and a lock lever pivotally mounted on the base plate by a third shaft and connected to the door detection lever by a third connecting means, said lock lever being displaced from an unlocked position to a locked position when the door detection lever is brought into contact with the rear panel;

wherein said lock lever is configured such that rotation of the ratchet release lever can be restricted through mechanical abutment against the lock lever when the lock lever is displaced to the locked position;

wherein said coupling spring includes a coiled portion disposed around the periphery of the first shaft, a first leg abutting against the open lever for urging the open lever to a first direction, and a second leg abutting against the open lever for urging the open lever to a second direction opposite to the first direction; and wherein said second leg can also abut against the ratchet release lever for urging the ratchet release lever to the second direction.

2. The door latch device for a rear door of a vehicle according to claim 1, wherein said second leg is undetachably engaged with the ratchet release lever.

3. A door latch device for a vehicle rear door having a front panel adjacently opposed to a rear panel of a vehicle front door in a substantially parallel condition when the front door is moved to a door closed position with respect to a vehicle body, wherein the front door is pivotally mounted on the vehicle body at its front edge part, the rear door is pivotally mounted on the vehicle body at its rear edge part, and the door latch device prevents the rear door from opening when the front door is closed and enables the rear door to be opened when the front door is opened, the door latch device comprising:

an upper latch unit provided at an upper part of the rear door and engageable with an upper striker fixed onto the vehicle body;

a lower latch unit provided at a lower part of the rear door and engageable with a lower striker fixed onto the vehicle body;

a base plate secured on the rear door;

a ratchet release lever pivotally mounted on the base plate by a first shaft, said ratchet release lever comprising a first arm connected to the upper latch unit by a first connecting means, and a second arm connected to the lower latch unit by a second connecting means;

an open lever connected to an open handle of the rear door by a third connecting means, said open lever rotates the ratchet release lever when turned in a first direction about a second shaft in response to an opening operation of the open handle toward a door-opening direction;

a door detection lever pivotally mounted on the rear door by a third shaft and rotatable in response to abutment against the rear panel of the front door when the front door is closed; and a lock lever pivotally mounted on the base plate by a fourth shaft and connected to the door detection lever by a fourth connecting means, said lock lever being displaced from an unlocked position to a locked position when the door detection lever is brought into contact with the rear panel;

wherein said open lever is pivotally mounted on the lock lever by the second shaft, and the open lever and the third connecting means are linked by a lost-motion mechanism that becomes active when the lock lever is displaced to the locked position.

4. The door latch device for a rear door of a vehicle according to claim 3, wherein said open lever is urged to the first direction by resilience of a spring, thereby when the lock lever is displaced from the unlocked position to the locked position, the open lever moves to the first direction by the resilience of the spring in order to activate the lost-motion mechanism.

* * * * *